(12) United States Patent
Yeh (10) Patent No.: US 7,128,628 B2
(45) Date of Patent: Oct. 31, 2006

(54) SLIDER HAVING A DIRECTION LOCATING STRUCTURE

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 23 days.

(21) Appl. No.: 11/103,862

(22) Filed: Apr. 12, 2005

(65) Prior Publication Data

US 2005/0215138 A1 Sep. 29, 2005

Related U.S. Application Data

(63) Continuation-in-part of application No. 10/797,094, filed on Mar. 11, 2004, and a continuation-in-part of application No. 10/386,634, filed on Mar. 13, 2003.

(30) Foreign Application Priority Data

Apr. 14, 2004 (TW) ............................ 93205742 U (51) Int. Cl.
*B63B 1/00* (2006.01)
(52) U.S. Cl. .......................................... 441/65; 441/74
(58) Field of Classification Search ................. 441/65, 441/74
See application file for complete search history.

(56) References Cited

U.S. PATENT DOCUMENTS

| | | | | | |
|---|---|---|---|---|---|
| 3,145,400 | A | * | 8/1964 | Yoakum ...................... | 441/65 |
| 3,952,354 | A | * | 4/1976 | Turner ........................ | 441/65 |
| 4,206,933 | A | * | 6/1980 | Koch .......................... | 441/65 |
| 4,850,913 | A | * | 7/1989 | Szabad, Jr. .................. | 441/65 |
| 4,878,980 | A | * | 11/1989 | Stedman ..................... | 441/65 |
| 5,211,593 | A | * | 5/1993 | Schneider et al. ........... | 441/65 |
| 5,647,784 | A | * | 7/1997 | Moran ........................ | 441/65 |
| 5,658,179 | A | * | 8/1997 | Glydon et al. ............... | 441/74 |
| 6,106,347 | A | * | 8/2000 | Harness ..................... | 441/74 |

* cited by examiner

*Primary Examiner*—Lars A. Olson
(74) *Attorney, Agent, or Firm*—Rosenberg, Klein & Lee (57) ABSTRACT

A slider having a direction locating structure includes a foam board, a surface layer, a bottom layer, and a plurality of direction locating strips. Thus, the direction locating strips protruded outwardly from the bottom face of the bottom layer are inserted into the snowy, sandy or muddy ground during movement of the slider to provide a direction locating effect, so that the slider is moved forward linearly and stably by guidance of the direction locating strips.

15 Claims, 10 Drawing Sheets

blank.

SLIDER HAVING A DIRECTION LOCATING STRUCTURE

CROSS REFERENCE TO RELATED APPLICATION

This application is a continuation-in-part application of co-pending U.S. application Ser. No. 10/797,094, filed Mar. 11, 2004, and also is a continuation-in-part application of co-pending U.S. application Ser. No. 10/386,634 filed, Mar. 13, 2003.

BACKGROUND OF THE INVENTION

1. Field of the Invention

The present invention relates to a slider, and more particularly to a slider having a direction locating structure.

2. Description of the Related Art

Figure 10:
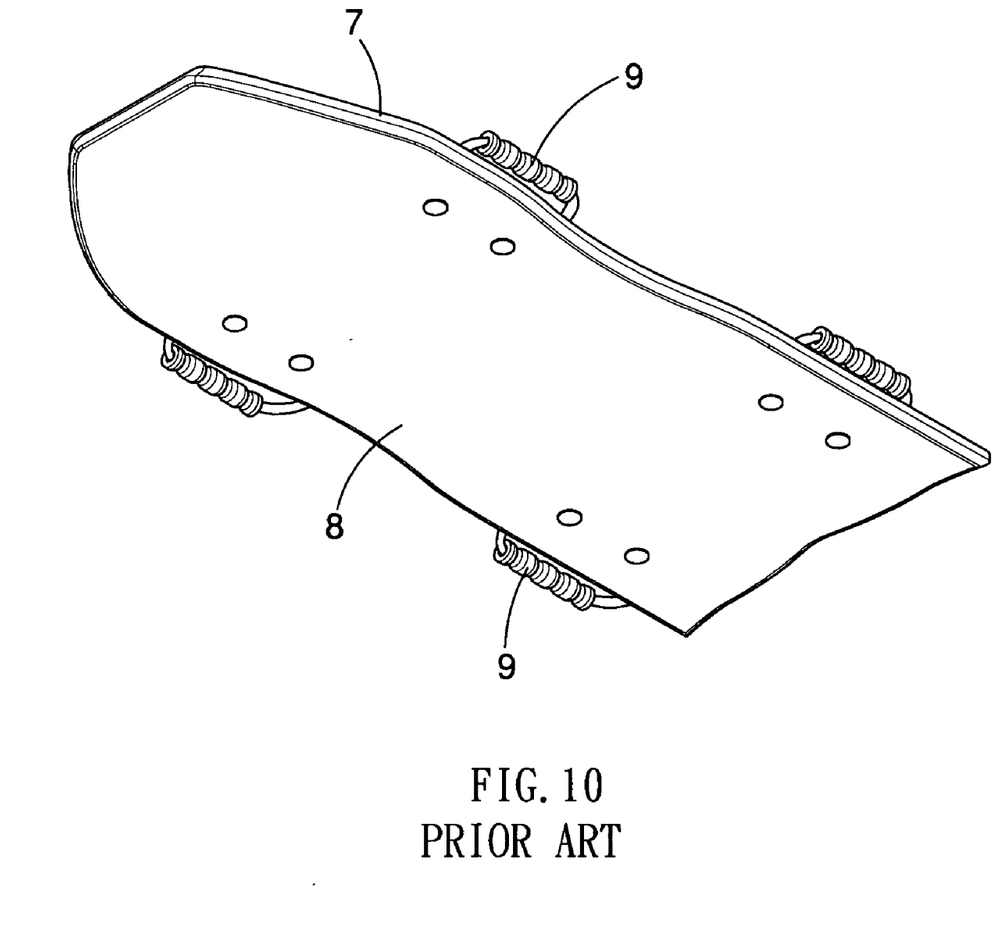
FIG. 10 is a perspective view of a conventional slider in accordance with the prior art.

A conventional slider in accordance with the prior art shown in FIG. 10 comprises a main board 7, a plastic plate 8 secured on a bottom of the main board 7, and a plurality of handgrips 9 mounted on a periphery of the main board 7 to facilitate a user holding the slider. However, when the slider is moved in the snowy, sandy or muddy ground, the travel direction of the slider is easily changed due to change of the user's center of gravity, so that the slider is moved forward unstably and the user easily falls down due to instability of the center of gravity, thereby causing inconvenience to the user in controlling the slider, and thereby causing danger to the user.

SUMMARY OF THE INVENTION

The primary objective of the present invention is to provide a slider having a direction locating structure.

Another objective of the present invention is to provide a slider, wherein the direction locating strips protruded outwardly from the bottom face of the bottom layer are inserted into the snowy, sandy or muddy ground during movement of the slider to provide a direction locating effect, so that the slider is moved forward linearly and stably by guidance of the direction locating strips to prevent a user from falling down due to instability of the center of gravity, thereby facilitating the user in controlling the slider, and thereby protecting the user's safety.

A further objective of the present invention is to provide a slider, wherein the surface layer has a pattern which is visible from outside, thereby enhancing the outer appearance of the slider.

In accordance with one embodiment of the present invention, there is provided a slider which comprises a foam board, a surface layer, a bottom layer and a plurality of direction locating strips. The foam board has a top face, a bottom face and a peripheral wall. The surface layer is heat bonded to the top face and the peripheral wall of the foam board without adhesives. In addition, the bottom layer has a top face heat bonded to the bottom face of the foam board completely without adhesives and has a bottom face having a front side and a rear side, wherein the front side of the bottom face of the bottom layer is directed toward a travel direction of the slider. The direction locating strips are formed on and protruded outward from the bottom face of the bottom layer and are parallel with each other.

Furthermore, each of the direction locating strips is linearly extended from the front side to the rear side of the bottom face of the plastic plate so that the slider is moved forward linearly and stably by guidance of the direction locating strips to prevent a user from falling down due to instability of the center of gravity, thereby facilitating the user in controlling the slider, and thereby protecting the user's safety.

Further benefits and advantages of the present invention will become apparent after a careful reading of the detailed description with appropriate reference to the accompanying drawings.

DETAILED DESCRIPTION OF THE INVENTION

Figure 1:
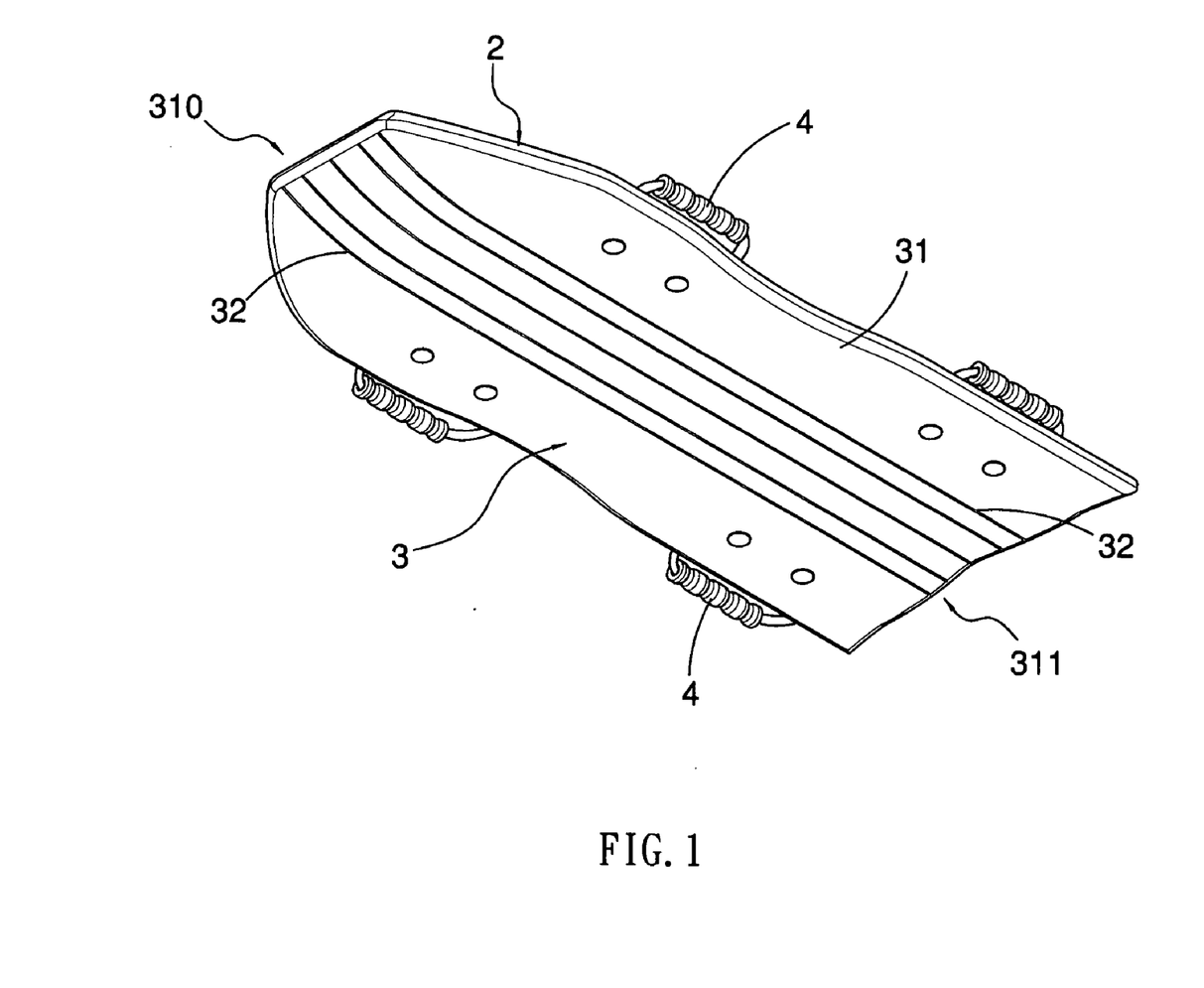
FIG. 1 is a bottom perspective view of a slider in accordance with the preferred embodiment of the present invention.
Figure 2:
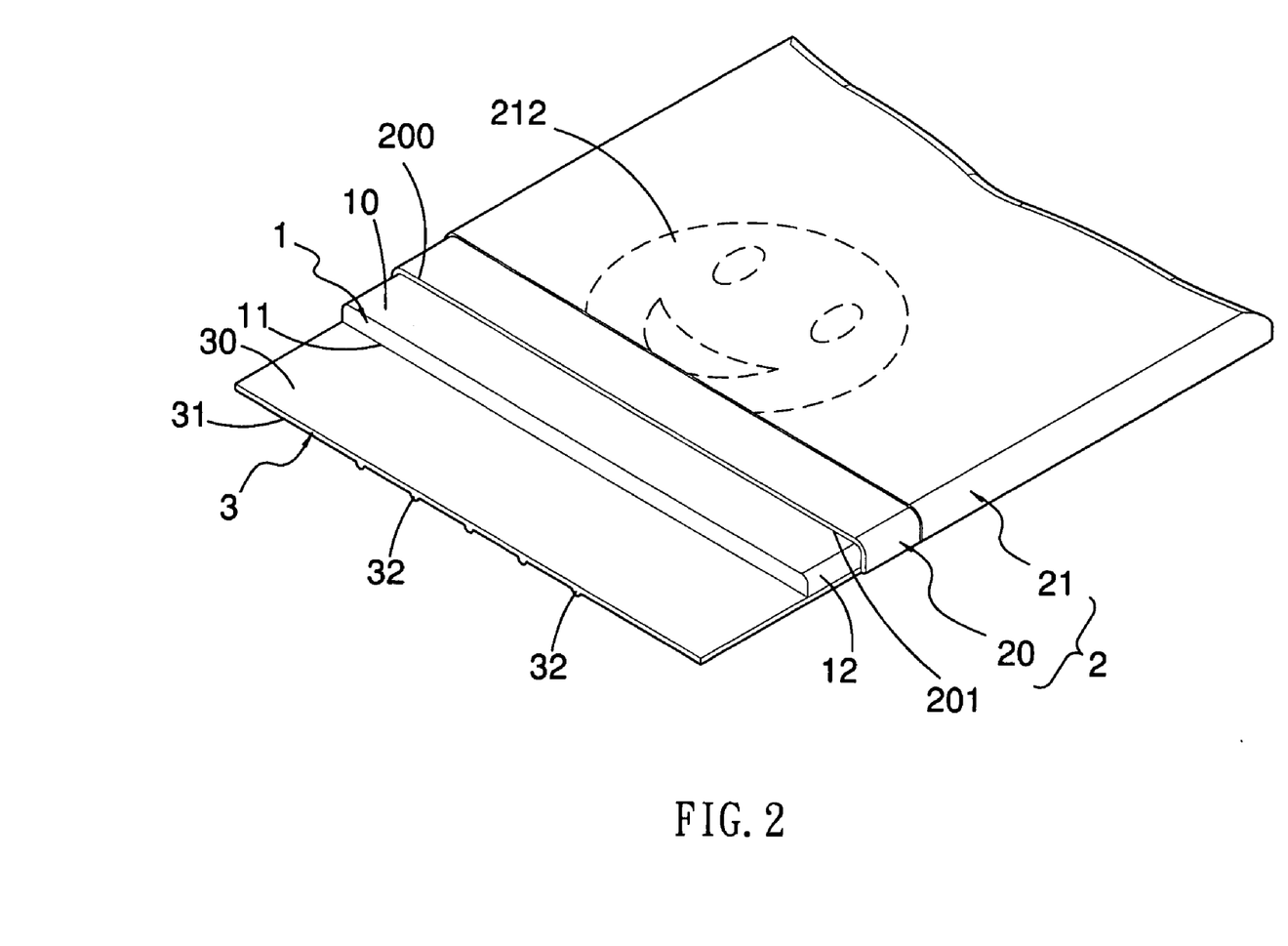
FIG. 2 is a partially cut-away perspective view of the slider as shown in FIG. 1.
Figure 3:
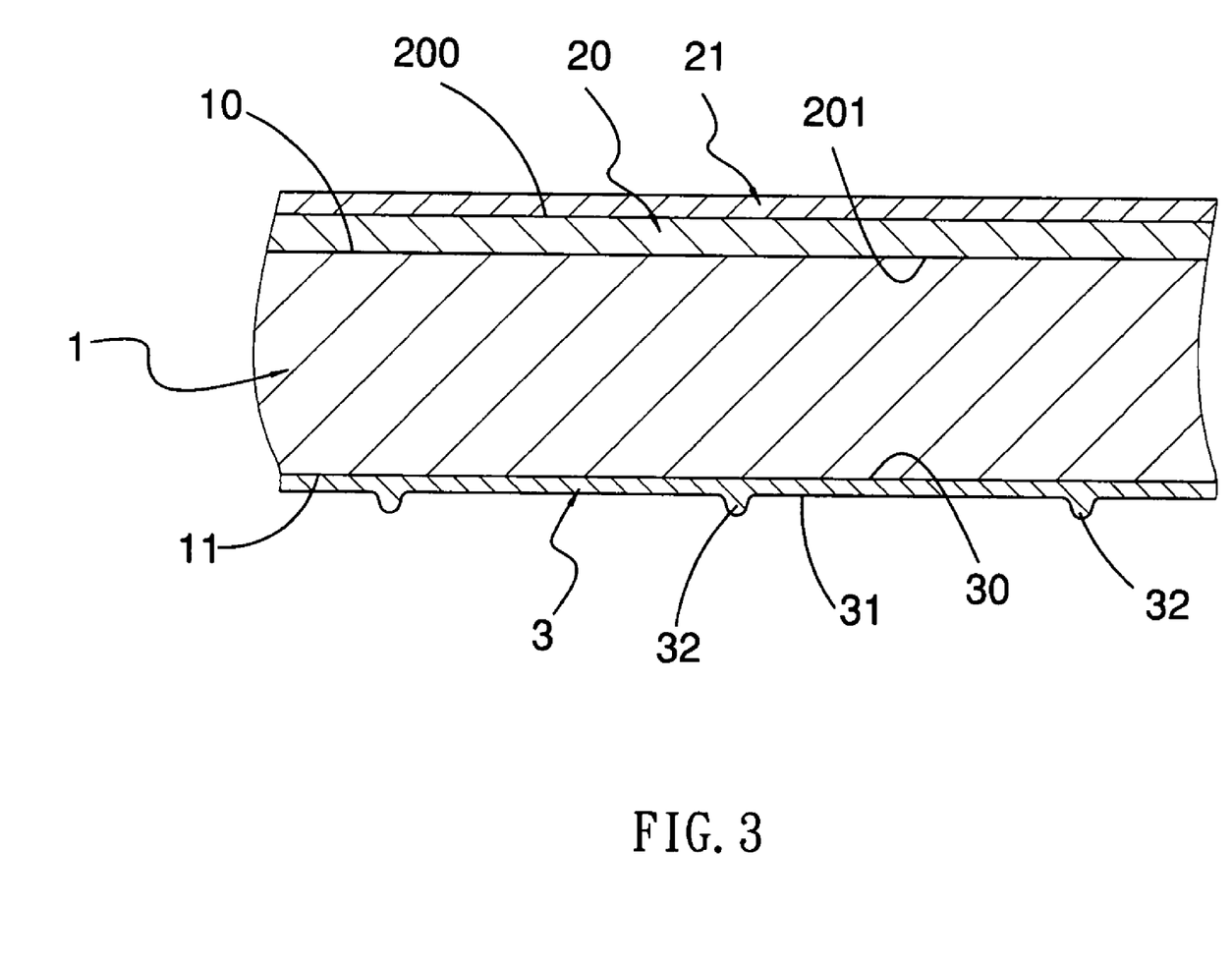
FIG. 3 is a plan cross-sectional view of the slider as shown in FIG. 2.

Referring to the drawings and initially to FIGS. 1–3, a slider in accordance with a first embodiment of the present invention comprises a foam board 1, a surface layer 2, a bottom layer 3, a plurality of direction locating strips 32, and a plurality of handgrips 4.

The foam board 1 is made of a foam material, such as polyethylene material and has a top face 10, a bottom face 11 and a peripheral wall 12. The foam board 1 could be a single layer of foam board or a multi-layer of foam board.

The surface layer 2 is heat bonded to the top face 10 and the peripheral wall 12 of the foam board 1 completely without adhesives. The surface layer 2 could be a patterned/colored laminated plastic film or a patterned/colored laminated layer composed of plastic films and a polyethylene foam skin.

The bottom layer 3 is made of plastic material, preferably, a wear-resistant plastic plate, which has a top face 30 heat bonded to the bottom face 11 of the foam board 1 completely without adhesives and a bottom face 31 having a front side 310 and a rear side 311, as shown in FIG. 1. The front side 310 of the bottom face 31 of the plastic plate 3 is directed toward a travel direction of the slider.

The direction locating strips 32 are formed on and protruded outwardly from the bottom face 31 of the bottom layer 3 and are parallel with each other. Each of the direction locating strips 32 is linearly extended from the front side 310 to the rear side 311 of the bottom face 31 of the plastic plate 3. Preferably, each of the direction locating strips 32 has a height ranged between 0.5 mm and 4 mm.

The handgrips 4 are located at two opposite sides of the slider to facilitate a user holding the slider.

As shown in FIGS. 2 and 3, the surface layer 2 is a laminated layer comprises a polyethylene foam skin 20 and a laminated film 21. The polyethylene foam skin 20 has a bottom face 201 heat bonded to the top face 10 and the peripheral wall 12 of the foam board 1 completely without adhesives. The laminated film 21 is heat bonded to a top face 200 of the polyethylene foam skin 20 completely. Furthermore, the polyethylene foam skin 20 of the surface layer 2 has a density greater than that of the foam board 1. Preferably, the optimum density of the polyethylene foam skin 20 of the surface layer 2 is ranged between 1.5 PCF and 10 PCF. The laminated film 21 of the surface layer 2 has a pattern 212 formed therein and the pattern 212 is visible from outside of the surface layer 2 as shown in FIG. 2.

Preferably, the pattern 212 is formed on a surface of the laminated film 21 of the surface layer 2 and combined with the polyethylene foam skin 20 of the surface layer 2. Alternatively, the laminated film 21 of the surface layer 2 is composed of multi-layer plastic films, and the pattern 212 is located between the plastic films. Then, the laminated film 21 of the surface layer 2 is bonded to the polyethylene foam skin 20.

Figure 4:
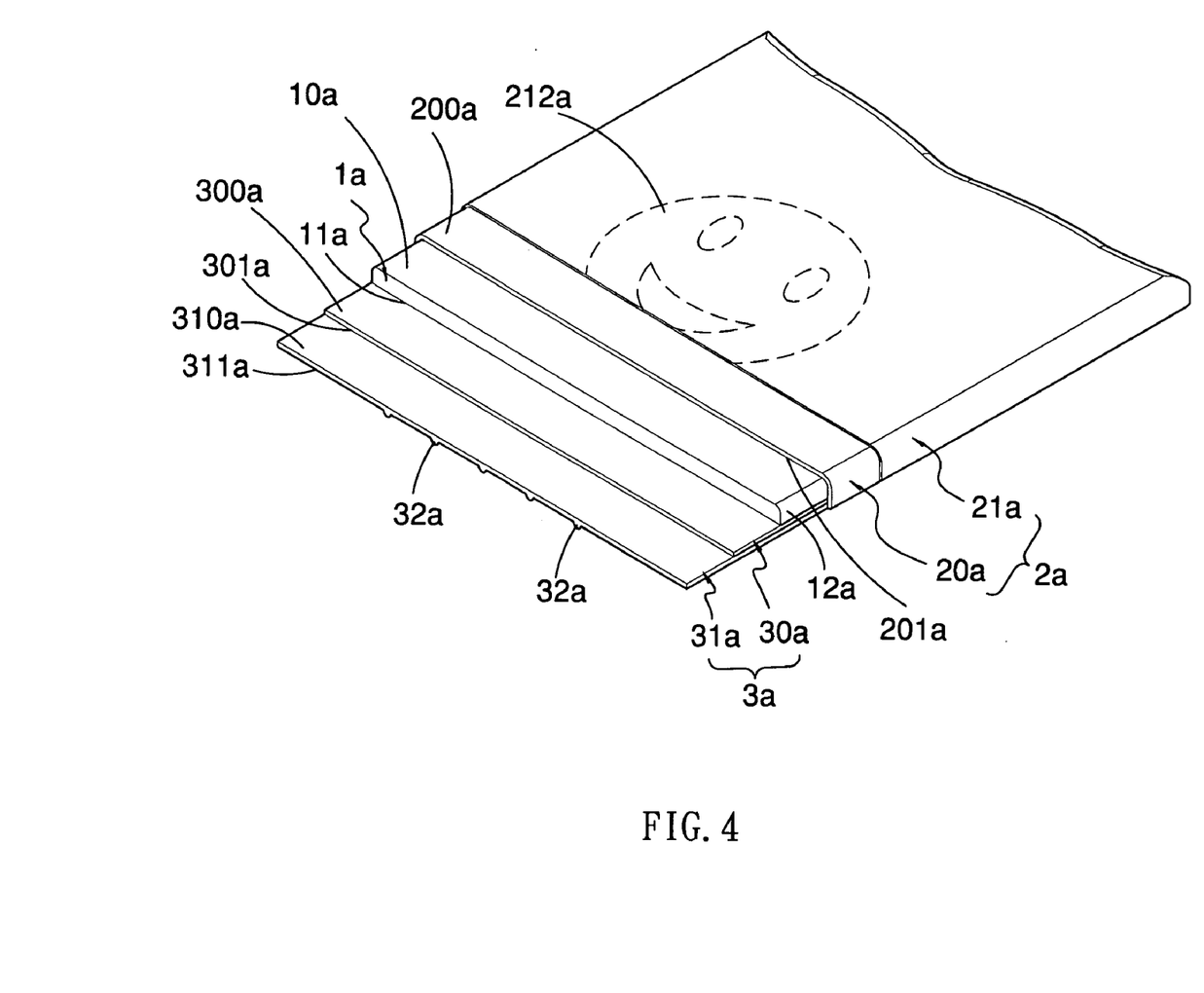
FIG. 4 is a partially cut-away perspective view of a slider in accordance with a second embodiment of the present invention.

Referring to FIG. 4, a slider in accordance with a second embodiment of the present invention comprises a foam board 1a, a surface layer 2a, a bottom layer 3a and a plurality of direction locating strips 32a.

The foam board 1a is the same as the foam board 1 of the first embodiment and has a top face 10a, a bottom face 11a and a peripheral wall 12a. The surface layer 2a is the same as the surface layer 2 of the first embodiment and heat bonded to the top face 10a and the peripheral wall 12a of the foam board 1a completely without adhesives.

Similarly to the first embodiment, the surface layer 2a shown in FIG. 4 includes a first polyethylene foam skin 20a having a bottom face 201a heat bonded to the top face 10a and the peripheral wall 12a of the foam board 1a completely, and a laminated film 21a heat bonded to a top face 200a of the first polyethylene foam skin 20a completely. The first polyethylene foam skin 20a of the surface layer 2a has a density greater than that of the foam board 1a. Preferably, the optimum density of the first polyethylene foam skin 20a of the surface layer 2a is ranged between 1.5 PCF and 10 PCF. The laminated film 21a of the surface layer 2a has a pattern 212a which is visible from outside or the surface layer 2a.

The bottom layer 3a of the second embodiment includes a second polyethylene foam skin 30a and a plastic plate 31a. The second polyethylene foam skin 30a has a top face 301a heat bonded to the bottom face 11a of the foam board 1a completely. The second polyethylene foam skin 30a has a density greater than that of the foam board 1a. Preferably, the optimum density of the second polyethylene foam skin 30a is ranged between 1.5 PCF and 10 PCF. The plastic plate 31a has a top face 310a heat bonded to a bottom face 301a of the second polyethylene foam skin 30a.

The direction locating strips 32a are the same as the direction locating strips 32 of the first embodiment. The direction locating strips 32a are formed on and protruded outwardly from a bottom face 310a of the plastic plate 31a.

Figure 5:
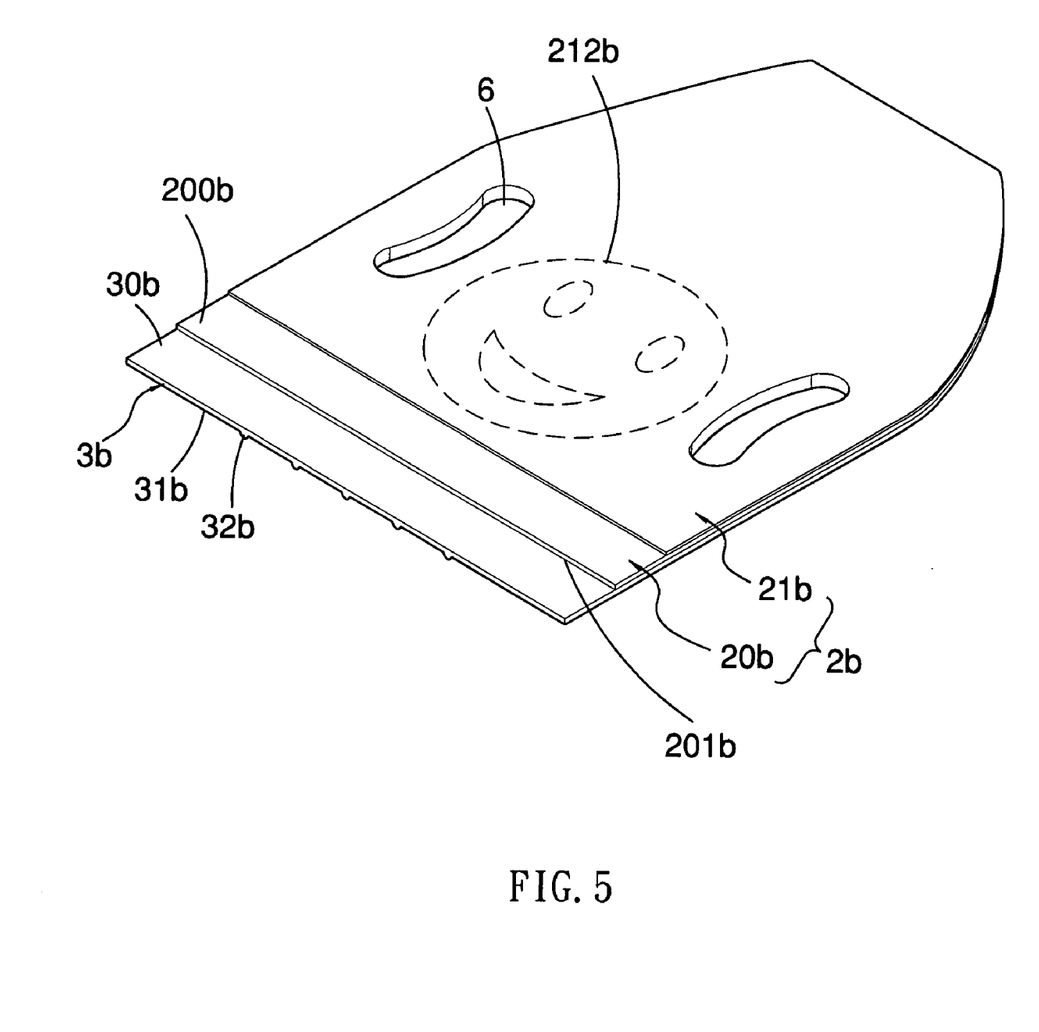
FIG. 5 is a perspective view of a slider in accordance with a third embodiment of the present invention.

Referring to FIG. 5, a slider in accordance with a third embodiment of the present invention comprises a plastic plate 3b, a surface layer 2b, and a plurality of direction locating strips 32b. Furthermore, the plastic plate 3b and the surface layer 2b are the same as the plastic plate 31a of the second embodiment and the surface layer 2, 2a of the previous embodiments.

The surface layer 2b is bonded to a top face 30b of the plastic plate 3b and includes a polyethylene foam skin 20b and a laminated film 21b. The polyethylene foam skin 20b has a bottom face 201b heat bonded to the top face 30b of the plastic plate 3b completely without adhesives. The laminated film 21b heat bonded to a top face 200b of the polyethylene foam skin 20b completely. Preferably, the optimum density of the polyethylene foam skin 20b of the surface layer 2b is ranged between 1.5 PCF and 10 PCF. In addition, the polyethylene foam skin 20b of the surface layer 2b could be a single layer of foam skin or a multi-layer of foam skin. The laminated film 21b of the surface layer 2b has a pattern 212b which is visible from outside of the surface layer 2b as shown in FIG. 5.

The direction locating strips 32b are the same as the direction locating strips 32, 32b of the previous embodiment. The direction locating strips 32b are formed on and protruded outwardly from the bottom face 31b of the plastic plate 3b. In addition, the slider has at least two holding holes 6 extended therethrough to facilitate a user in holding the slider.

Preferably, the pattern 212b is formed on a surface of the laminated film 21b of the surface layer 2b and bonded to the polyethylene foam skin 20b of the surface layer 2b. Alternatively, the laminated film 21b of the surface layer 2b is composed of multi-layer plastic films, and the pattern 212b is located between the plastic films of the laminated film 21b of the surface layer 2b. Then, the laminated film 21b of the surface layer 2b is bonded to the polyethylene foam skin 20b.

Figure 6:
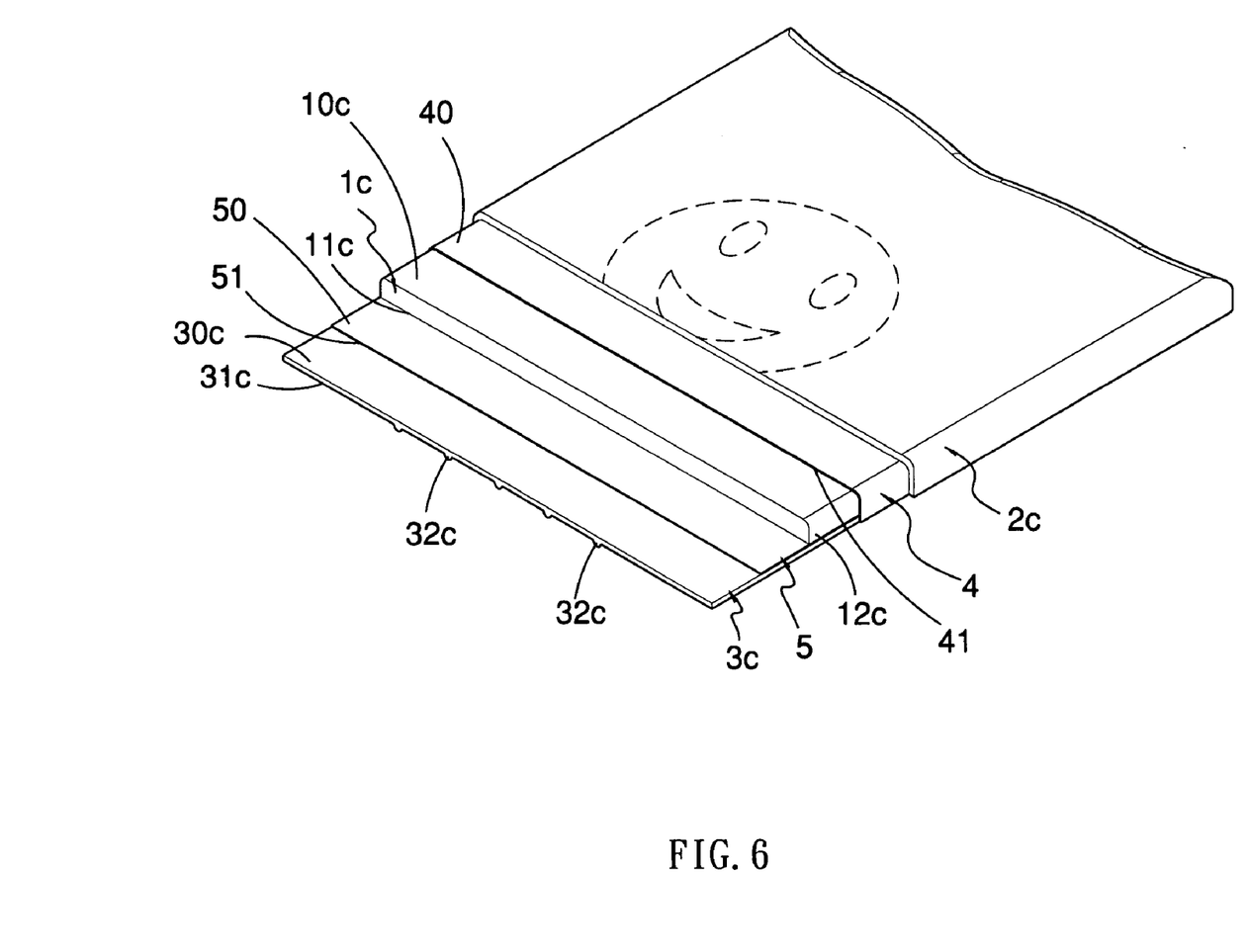
FIG. 6 is a partially cut-away perspective view of a slider in accordance with a fourth embodiment of the present invention.
Figure 7:
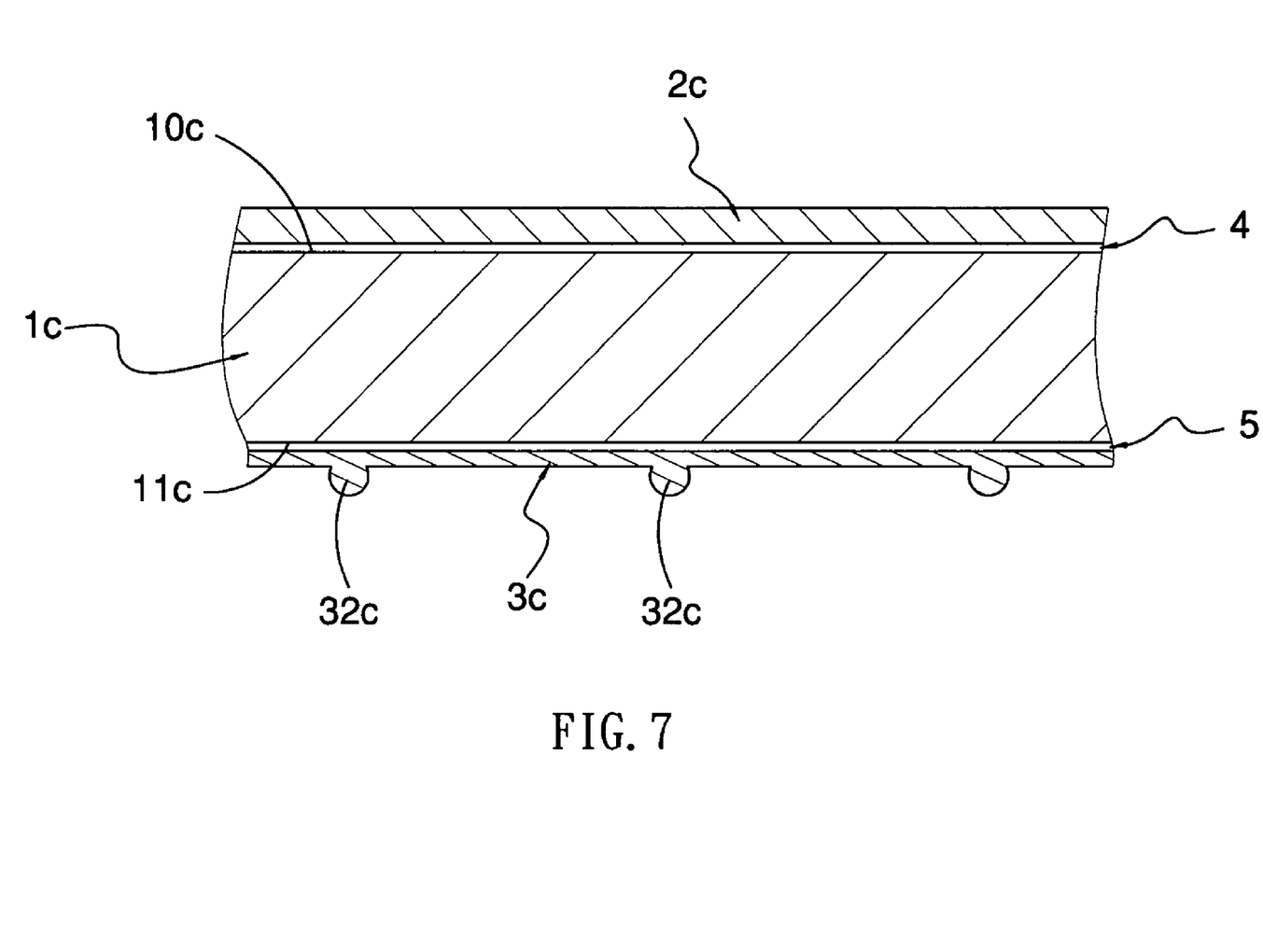
FIG. 7 is a plan cross-sectional view of the slider as shown in FIG. 6.

With reference to FIGS. 6 and 7, a fourth embodiment of the present invention includes a polystyrene foam board 1c, a first bonding layer 4, a second bonding layer 5, a surface layer 2c, a bottom layer 3c, and a plurality of direction locating strips 32c. The fourth embodiment are similar to the foregoing embodiments except the polystyrene foam board 1c, the first bonding layer 4 and the second bonding layer 5.

The polystyrene foam board 1c has a top face 10c, a bottom face 11c and a peripheral wall 12c. The first bonding layer 4 has a bottom face 41 heat bonded to the top face 10c and the peripheral wall 12c of the polystyrene foam board 1c without adhesives. Furthermore, the second bonding layer 5 has a top face 50 heat bonded to the bottom face 11c of the polystyrene foam board 1c without adhesives.

The surface layer 2c is heat bonded to a top face 40 of the first bonding layer 4 completely, whereby the surface layer 2c is heat bonded over the top face 10c and the peripheral wall 12c of the polystyrene foam board 1c by the first bonding layer 4. The bottom layer 3c has a top face 30c heat bonded to a bottom face 51 of the second bonding layer 5 completely. Furthermore, the direction locating strips 32c are formed on and protruded outwardly from the bottom face 31c of the bottom layer 3c and parallel with each other, similarly to the foregoing direction locating strips 32, 32a, 32b.

In addition, the surface layer 2c and the bottom layer 3c of the fourth embodiment are similar to the previous embodiment; therefore, the surface layer 2c can be a laminated layer composed of with a polyethylene foam skin and a patterned/colored laminated film with patterns or a single patterned/colored film. The bottom layer 3c can be a laminated layer composed of with a polyethylene foam skin and a plastic plate or a single plastic plate. For heat laminated procedures, the first bonding layer 4 is preferable to be pre-coated on the surface layer 2c and the second bonding layer 5 is preferable to be pre-coated on the bottom layer 3c.

It is known that polystyrene materials are incompatible with polyethylene materials while heat bonding; therefore, the polyethylene film, foam skin or plate is difficult to heat bond to the polystyrene foam board 1c without adhesives. In the fourth embodiment, because the first bonding layer 4c and the second bonding layer 5 have characteristics provided for thermal fusing the polystyrene materials and the polyethylene materials mutually, the surface layer 2c and the bottom layer 3c can be heat bonded to the polystyrene foam board 1c without adhesives by the first bonding layer 4c and the second bonding layer 5.

Figure 8:
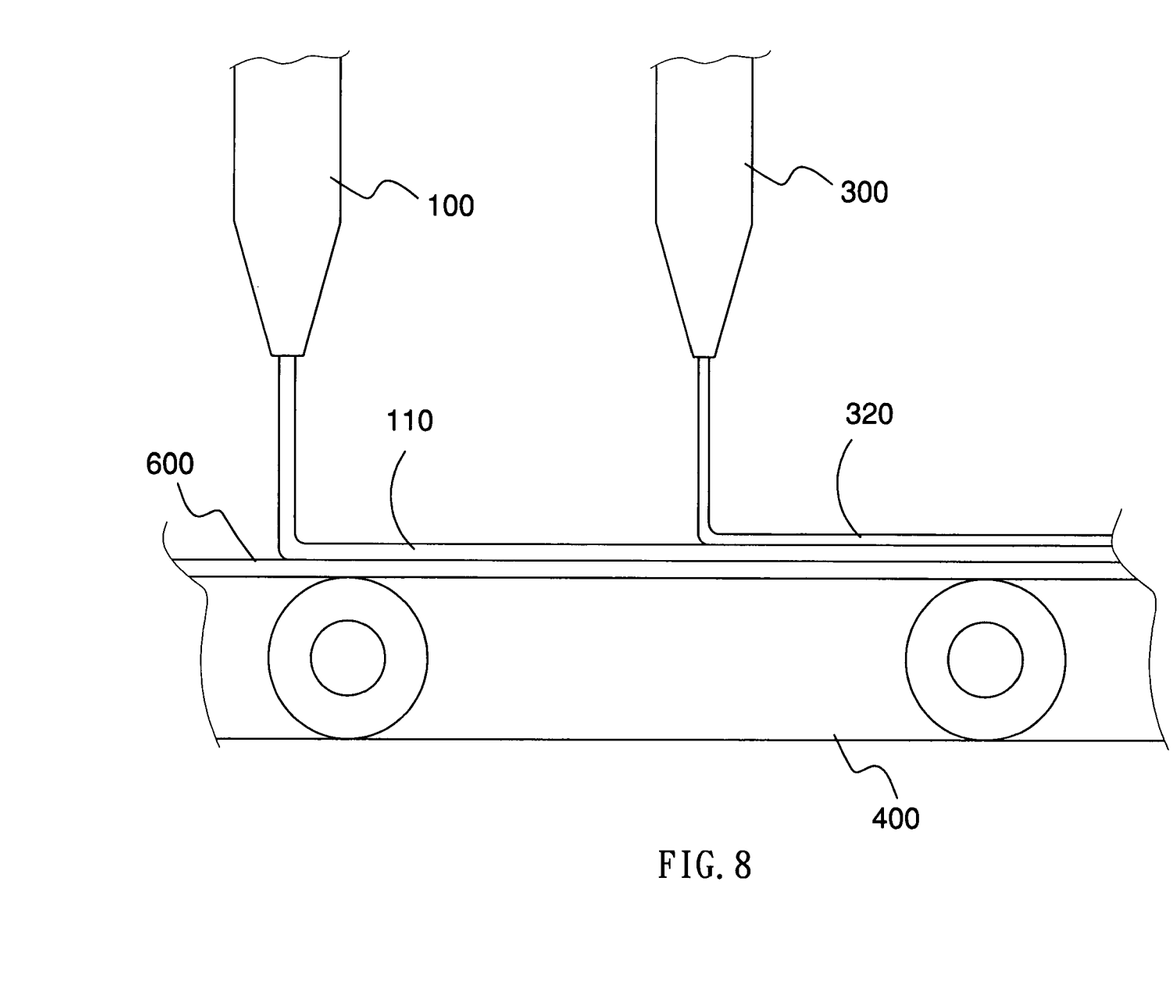
FIG. 8 is a partially perspective view which shows a method for forming the direction locating strips on the plastic plate of the invention.

In addition, FIG. 8 shows a method for forming the direction locating strips on a plastic plate and the method comprises the following steps. First, provide a polyethylene foam sheet 600 and then extrude a hot-melting plastic sheet directly onto the polyethylene foam sheet 600 by a first extruder 100, so as to form the plastic plate 110 which has a face heat bonded on a face of the polyethylene foam sheet 600. Subsequently, the plastic plate 110 with the polyethylene foam sheet 600 is conveyed to a second extruder 300 by a conveyer device 400. Then, the second extruder 300 extrudes a plurality of hot-melting strips directly to the other face of the plastic plate 110 to form the direction locating strips 320, which are heat bonded to the other face of the plastic plate 110 and protruded therefrom. Furthermore, the direction locating strips can also apply any suitable technique to form on the plastic plate 110, in other preferable embodiments.

Figure 9:
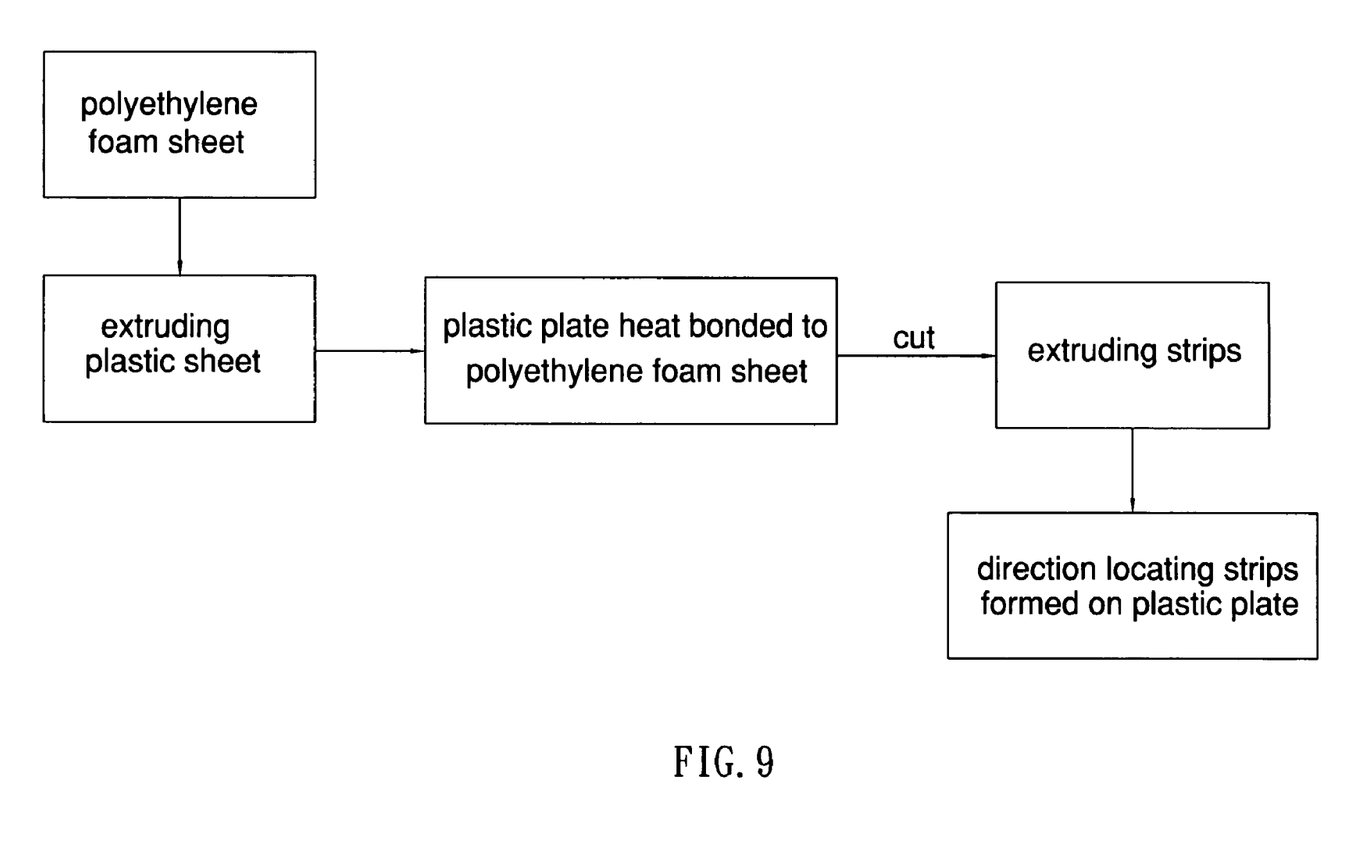
FIG. 9 is a schematic flow diagram of the another method for forming the direction locating strips of the plastic plate.

Another method for forming a plurality of direction locating strips on a plastic plate is shown schematically in FIG. 9 and the method comprises the following steps. First, provide a polyethylene foam sheet and then extrude a hot-melting plastic sheet directly onto the polyethylene foam sheet by a first extruder, so as to form the plastic plate which has a face heat bonded on a face of the polyethylene foam sheet. Subsequently, cut the plastic plate together with the polyethylene foam sheet into a designed shape and then convey the cut plastic plate with the polyethylene foam sheet to a second extruder by a conveyer device. Then, the second extruder extrudes a plurality of hot-melting strips directly to the other face of the plastic plate to form the direction locating strips, which are heat bonded to the other face of the plastic plate and protruded therefrom. Also, the direction locating strips can also apply any suitable technique to form on the plastic plate, in other preferable embodiments.

Accordingly, the direction locating strips protruded outwardly from the bottom face of the bottom layer are inserted into the snowy, sandy or muddy ground during movement of the slider to provide a direction locating effect, so that the slider is moved forward linearly and stably by guidance of the direction locating strips to prevent a user from falling down due to instability of the center of gravity, thereby facilitating the user in controlling the slider, and thereby protecting the user's safety. In addition, the surface layer has a pattern which is visible from outside, thereby enhancing the outer appearance of the slider.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A slider, comprising:
    a foam board having a top face, a bottom face and a peripheral wall;
    a surface layer heat bonded to the top face and the peripheral wall of the foam board;
    a bottom layer having a top face heat bonded to the bottom face of the foam board completely and a bottom face having a front side and a rear side, wherein the front side of the bottom face of the bottom layer is directed toward a travel direction of the slider; and
    a plurality of direction locating strips formed on and protruded outwardly from the bottom face of the bottom layer and the direction locating strips being parallel with each other; wherein each of the direction locating strips is linearly extended from the front side to the rear side of the bottom face of the bottom layer;
    wherein the bottom layer comprises:
    a polyethylene foam skin having a top face heat bonded to the bottom face of the foam board; and
    a plastic plate having a top face heat bonded to a bottom face of the polyethylene foam skin and a bottom face formed with the direction locating strips; wherein the polyethylene foam skin of the bottom layer has a density greater than that of the foam board.

2. The slider of claim 1, wherein the surface layer comprises:
    a polyethylene foam skin having a bottom face heat bonded to the top face and the peripheral wall of the foam board; and
    a laminated film heat bonded to a top face of the polyethylene foam skin completely; wherein the polyethylene foam skin of the surface layer has a density greater than that of the foam board and the laminated film of the surface layer has a pattern which is visible from outside of the surface layer.

3. The slider of claim 2, wherein each of the direction locating strips has a height ranged between 0.5 mm and 4 mm.

4. The slider of claim 1, wherein the surface layer comprises a laminated film heat bonded to the top face and the peripheral wall of the foam board; wherein the laminated film of the surface layer has a pattern which is visible from outside of the surface layer.

5. A slider, comprising:
    a polystyrene foam board having a top face, a bottom face and a peripheral wall;
    a first bonding layer having a bottom face heat bonded to the top face and the peripheral wall of the polystyrene foam board;
    a second bonding layer having a top face heat bonded to the bottom face of the polystyrene foam board;
    a surface layer heat bonded to a top face of the first bonding layer completely, whereby the surface layer covers the top face and the peripheral wall of the polystyrene foam board by the first bonding layer;
    a bottom layer having a top face heat bonded to a bottom face of the second bonding layer completely and a bottom face having a front side and a rear side, wherein the front side of the bottom face of the bottom layer is directed toward a travel direction of the slider; and
    a plurality of direction locating strips formed on and protruded outwardly from the bottom face of the bottom layer and the direction locating strips being parallel with each other: wherein each of the direction locating strips is linearly extended from the front side to the rear side of the bottom face of the bottom layer;

wherein the bottom layer comprises:
a polyethylene foam skin having a top face heat bonded to the bottom face of the second bonding layer; and
a plastic plate having a top face heat bonded to a bottom face of the polyethylene foam skin and a bottom face formed with the direction locating strips; wherein the polyethylene foam skin of the bottom layer has a density greater than that of the foam board.

6. The slider of claim 5, wherein the surface layer comprises:
a polyethylene foam skin having a bottom face heat bonded to the top face of the first bonding layer; and
a laminated film heat bonded to a top face of the polyethylene foam skin completely; wherein the polyethylene foam skin of the surface layer has a density greater than that of the foam board and the laminated film of the surface layer has a pattern which is visible from outside of the surface layer.

7. The slider of claim 6, wherein each of the direction locating strips has a height ranged between 0.5 mm and 4 mm.

8. The slider of claim 5, wherein the surface layer includes a laminated film heat bonded to the top face of the first bonding film;
wherein the laminated film of the surface layer has a pattern which is visible from outside of the surface layer.

9. A slider, comprising:
a plastic plate having a bottom face having a front side and a rear side, wherein the front side of the bottom face of the plastic plate is directed toward a travel direction of the slider;
a surface layer heat bonded to a top face of the plastic plate completely; and
a plurality of direction locating strips formed on and protruded outwardly from the bottom face of the plastic plate and the direction locating strips being parallel with each other; wherein each of the direction locating strips is linearly extended from the front side to the rear side of the bottom face of the plastic plate.

10. The slider of claim 9, wherein the surface layer comprises:
a polyethylene foam skin having a bottom face heat bonded to the top face of the plastic plate completely; and
a laminated film heat bonded to a top face of the polyethylene foam skin completely; wherein the laminated film of the surface layer has a pattern which is visible from outside of the surface layer.

11. The slider of claim 10, wherein each of the direction locating strips has a height ranged between 0.5 mm and 4 mm.

12. The slider of claim 9, wherein the surface layer is a polyethylene foam skin.

13. The slider of claim 12, wherein each of the direction locating strips has a height ranged between 0.5 mm and 4 mm.

14. A method for forming a plurality of direction locating strips on a plastic plate comprising:
providing a polyethylene foam sheet;
extruding a plastic sheet directly onto the polyethylene foam sheet to form the plastic plate which has a face heat bonded on a face of the polyethylene foam sheet; and
extruding a plurality of strips directly to the other face of the plastic plate to form the direction locating strips which are heat bonded to the other face of the plastic plate and protruded therefrom.

15. A method for forming a plurality of direction locating strips on a plastic plate comprising:
providing a polyethylene foam sheet;
extruding a plastic sheet directly onto the polyethylene foam sheet to form the plastic plate which has a face heat bonded on a face of the polyethylene foam sheet;
cutting the plastic plate together with the polyethylene foam sheet to form a designed shape;
extruding a plurality of strips directly onto and throughout the other face of the plastic plate to form the direction locating strips which are heat bonded to the other face of the plastic plate and protruded therefrom.

* * * * *